Dec. 13, 1960   D. R. CLEMONS   2,963,771
METHODS OF MAKING ELECTRICAL CAPACITORS
Filed Jan. 23, 1956
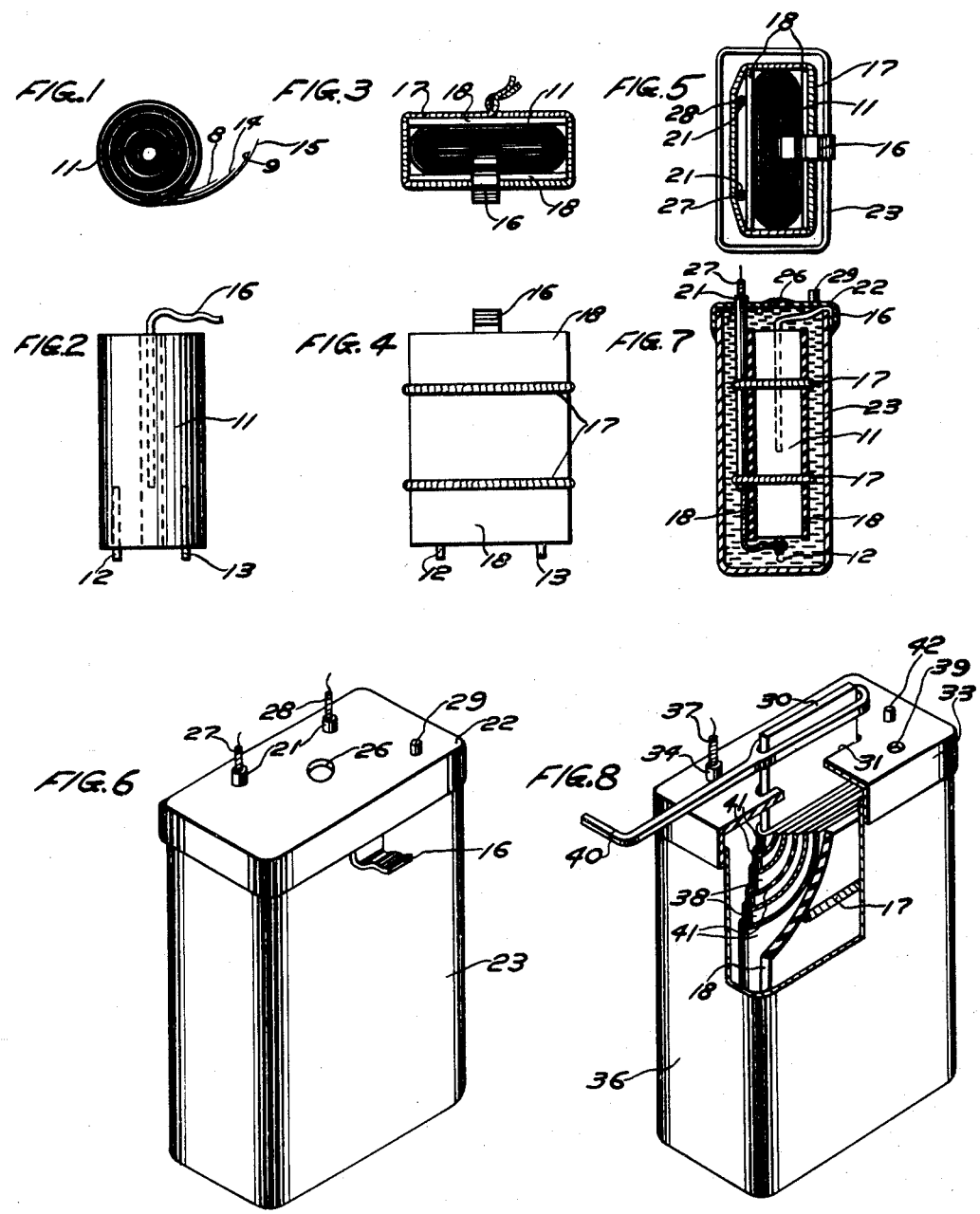
INVENTOR
D. R. CLEMONS
BY J. R. Hall
ATTORNEY United States Patent Office 2,963,771
Patented Dec. 13, 1960

2,963,771

METHODS OF MAKING ELECTRICAL CAPACITORS

Dale R. Clemons, Riverside, Ill., assignor to Western Electric Company, Incorporated, New York, N.Y., a corporation of New York Filed Jan. 23, 1956, Ser. No. 560,754

2 Claims. (Cl. 29—25.42)

This invention relates to methods of making electrical capacitors, and more particularly to methods of making an electrical capacitor having a predetermined capacitance between an electrode thereof and an electrically conductive housing.

An object of this invention is to provide new and improved methods of making electrical capacitors.

Another object of this invention is to provide new and improved methods of making an electrical capacitor having a predetermined capacitance between an electrode thereof and a metal housing.

A method illustrating certain features of the invention may include winding a plurality of interleaved dielectric and electrode layers to form a hollow roll. An elongated electroconductive strip is inserted loosely within the hollow center of the roll with one extremity thereof projecting therefrom. The roll is secured fixedly within an electrically conductive housing with the projecting extremity of the strip in sliding electrical contact with the housing. The capacitance between at least one electrode of the roll and the housing is measured, and the strip is moved progressively relative to the roll while continuous electrical contact is maintained between the strip and the housing. This movement of the strip progressively changes the capacitance between the electrode and the housing. When a predetermined value of capacitance is obtained between the electrode and the housing, the strip is fixedly attached electrically and mechanically to the housing so that the capacitance between the electrode and the housing is fixed at the predetermined value.

A complete understanding of the invention may be obtained from the following detailed description of electrical capacitors and methods of making them illustrating specific embodiments thereof, when read in conjunction with the appended drawings, in which Fig. 1 is an end view of a spiral roll of interleaved foil electrodes and paper strips;

Fig. 2 is an elevational view of the disclosure of Fig. 1 after a metallic adjusting strip has been inserted into an aperture in the roll in accordance with a method forming one embodiment of the invention;

Fig. 3 is an end view of the roll after it has been compressed and bound between insulating plates;

Fig. 4 is an elevational view of the disclosure of Fig. 3 showing the metallic adjusting strip projecting from the roll;

Fig. 5 is a top view of the compressed roll positioned in a can;

Fig. 6 is a perspective view of the can containing the roll showing the metallic adjusting strip projecting from the can before the cap and the can are soldered together;

Fig. 7 is a cross-sectional view showing the roll supported in the can by the cap after the capacitor has been adjusted and impregnated and the cap has been soldered to the can; and Fig. 8 is a cut away perspective view of a capacitor forming a second embodiment of the invention wherein the adjusting strip is pulled through an aperture in the top of the can to adjust the capacitance and is then soldered to the can, which serves as one terminal of the capacitor.

Referring now in detail to the drawings, Figs. 1 and 2 show a cylindrical spiral roll or capacitor body 11 made up of two interleaved metallic foil electrodes 8 and 9 and two insulating paper strips 14 and 15 wound together with the strips separating the foil electrodes. Electrically conductive elements or terminal strips 12 and 13 are secured to and connected to the foil electrodes to serve as terminals of the capacitor. An electrically conductive metallic adjusting strip 16 is inserted into the center of the roll 11, and is insulated from the electrodes by the paper strips, the inner ends of which project beyond the inner ends of the foil electrodes and form the innermost turns of the roll, and the roll is then compressed and bound by wires 17 between insulating plates 18 as shown in Figs. 3 and 4. The electrodes 8 and 9 in the roll 11 now have a capacitance value relative to each other and to the metallic strip 16. The bound roll 11 is secured to metallic tubes 21 which pass through and are secured by soldering or the like to a cap 22 (Figs. 6 and 7) of a metallic can 23 for receiving the bound roll, whereby it is supported by the cap 22 when inserted into the can 23. Insulated lead wires 27 and 28 are passed through the tubes 21 and are soldered to the terminal strips 12 and 13 to serve as electrical connections to the electrodes 8 and 9 in the roll 11.

The capacitor body 11 is inserted into the can 23, and is placed over the can 23 with the metallic adjusting strip 16 positioned between the can 23 and the cap 22, as illustrated in Figs. 6 and 7, and the upper ends of the lead wires 27 and 28 are connected to short the electrodes 8 and 9. The capacitance value between the metallic strip 16 and the electrodes in the roll 11 is determined by a suitable well-known device (not shown) connected to the lead wires 27 and 28 and to the metallic strip 16. If this capacitance is above a predetermined desirable value, which it will be by having the adjusting strip 16 extend substantially through the roll 11, the can 23 is removed from the cap 22 and the adjusting strip 16 is withdrawn partially from the roll 11 to thus reduce the capacitance between the strip 16 and the electrodes 8 and 9 in the roll 11. The cap 22 is then mounted on the can 23 and the adjusted capacitance is determined. This procedure of adjusting and testing is continued until the capacitance between the metallic strip 16 and the foil electrodes 8 and 9 is at the predetermined desirable value, whereupon the end of the adjusting strip 16 is cut off at the point where it extends from the cap 22, and the can 23 and cap 22 are soldered together as shown in Fig. 7. A lug 29 on the cap 22 serves as a connection for grounding the can and the strip 16 whereby the electrodes 8 and 9 have a capacitance value relative to each other and each electrode has an adjusted capacitance value relative to ground when the capacitor is used. The capacitor is then impregnated with a desirable impregnant through an aperture 26 (Figs. 6 and 7) in the cap 22, after which impregnation the aperture 26 is sealed with solder.

In a second embodiment of the invention shown in Fig. 8 the roll or capacitor body 11 may include only one metallic foil electrode 38 and a paper insulating strip 41 wound into a roll, and one terminal element 12 (not shown in Fig. 8) secured to the electrode 38. A conductive adjusting strip 30 positioned in the roll 11 extends through a slot 31 in a cap 33 of a can 36 and serves as a second electrode of the capacitor. The foil electrode 38 and the paper strip 41 are rolled, compressed, and bound into an assembly as illustrated in Figs. 1–4, after which this assembly is mounted on a tubular member 34 passing through and secured to the cap 33 of the can 36 (Fig. 8). A lead wire 37 soldered to the terminal element 12 extends out of the can 36 through the tubular member 34. The conductive adjusting strip 30 extends out of the can 36 through the slot 31 in the cap 33 (Fig. 8).

The cap 33 and the can 36 are soldered together and the capacitor is impregnated with a desirable impregnant through an aperture 39 in the cap 33. The aperture 39 is then closed with solder and the capacitance value of the capacitor is tested by a suitable well-known device (not shown) connected to the lead wire 37 and the adjusting strip 30, which serves as one electrode of the capacitor. With the capacitance initially above a predetermined desirable value, the strip 30 is withdrawn through the slot 31 to reduce the amount of capacitance between the foil electrode 38 and the strip 30. A key 40 such as that shown in Fig. 8 may be provided for pulling the strip 30 through the slot 31 in the cap 33, the key 40 being rotated about its longitudinal axis to pull the strip 30 from the can 36. After the strip 30 is pulled to reduce the amount of it in the roll 11, the capacitance is again tested. This procedure of adjusting and testing is continued until the capacitance is reduced to the predetermined value, after which the projecting end of the strip 30 is severed. The strip 30 is then soldered to the cap 33 and the slot 31 is closed by soldering. A lug 42 on the cap 33 serves as one terminal of the capacitor and the lead wire 37 serves as the other terminal.

In still another embodiment of the invention, the capacitance between the foil electrodes 8 and 9 in the roll 11 can be adjusted by connecting the metallic strip 16 to one of the terminal elements 12 or 13 instead of to the can 23. The capacitance between the electrodes 8 and 9 is then reduced to a predetermined desirable value by withdrawing the strip 16 from the roll 11 until the predetermined value is reached.

It is to be understood that the above-described methods are simply illustrative of the application of the principles of this invention. Numerous other methods may be readily devised by those skilled in the art which will embody the principles of the invention and fall within the spirit and scope thereof.

What is claimed is:

1. The method of making an electrical capacitor having a predetermined capacitance between an electrode thereof and a metal housing, which comprises winding a plurality of interleaved dielectric and electrode layers to form a hollow roll, inserting an elongated electrically conductive strip loosely within the hollow center of the roll with one extremity thereof projecting externally therefrom, securing the roll fixedly within an electrically conductive housing with the projecting extremity of the strip in sliding electrical contact with the housing, measuring the capacitance between at least one electrode of the roll and the housing, progressively moving the strip relative to the roll while maintaining continuously the electrical contact between the strip and the housing thereby progressively changing the capacitance between the electrode and the housing, ceasing the movement of the strip when a predetermined value of capacitance is obtained between said electrode and the housing, and attaching the conductive strip fixedly electrically and mechanically to the housing in the determined position so that the capacitance between said electrode and the housing is fixed at the predetermined value.

2. The method of making an electrical capacitor having a predetermined capacitance between the electrodes thereof and a metal housing, which comprises winding a plurality of interleaved dielectric and electrode layers to form a hollow roll, inserting an elongated electrically conductive strip loosely within the hollow center of the roll with one extremity of the strip projecting externally therefrom, securing the roll fixedly within an electrically conductive housing with the projecting extremity of the strip in sliding electrical contact with the housing, shorting the electrodes of the roll together, measuring the capacitance between the housing and the shorted electrodes, progressively withdrawing the strip from the center of the roll while maintaining continuously the sliding electrical contact between the strip and the housing thereby progressively reducing the capacitance between the electrodes and the housing, ceasing the withdrawal of the strip when a predetermined value of capacitance is obtained between the shorted electrodes and the housing, and attaching the conductive strip fixedly electrically and mechanically to the housing in the determined position so that the capacitance between the electrode and the housing is fixed at the predetermined value.

References Cited in the file of this patent

UNITED STATES PATENTS

| | | |
|---|---|---|
| 1,200,063 | Wheeler | Oct. 3, 1916 |
| 1,548,801 | Jacobs | Aug. 4, 1925 |
| 1,567,068 | Lindberg | Dec. 29, 1925 |
| 1,774,875 | Evans | Sept. 2, 1930 |
| 2,304,667 | Taylor | Dec. 8, 1942 |
| 2,618,749 | Altenberger | Nov. 18, 1952 |

FOREIGN PATENTS

| | | |
|---|---|---|
| 524,323 | Belgium | May 17, 1954 |
| 742,614 | Great Britain | Dec. 30, 1955 |